(12) United States Patent
Gyanchandani et al.

(10) Patent No.: US 11,978,453 B2
(45) Date of Patent: May 7, 2024

(54) NATURAL LANGUAGE PROCESSING ROUTING

(71) Applicant: Amazon Technologies, Inc., Seattle, WA (US)

(72) Inventors: Narendra Gyanchandani, Sammamish, WA (US); Junqing Shang, Redmond, WA (US); Joe Pemberton, Seattle, WA (US); Rushi P Desai, Bellevue, WA (US); Liyuan Zhang, Bellevue, WA (US); Shubham Katiyar, Bothell, WA (US); Lawrence Mariadas Chettiar, Lake Forest Park, WA (US); Artun Kutchuk, La Jolla, CA (US); Naushad Zaveri, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 431 days.

(21) Appl. No.: 17/347,323

(22) Filed: Jun. 14, 2021

(65) Prior Publication Data

US 2022/0399023 A1    Dec. 15, 2022

(51) Int. Cl.
*G10L 15/28*    (2013.01)
*G06N 5/04*    (2023.01)
*G06N 20/00*    (2019.01)
*G10L 15/16*    (2006.01)
*G10L 15/18*    (2013.01)
*G10L 15/22*    (2006.01)

(52) U.S. Cl.
CPC .............. *G10L 15/28* (2013.01); *G06N 5/04* (2013.01); *G06N 20/00* (2019.01); *G10L 15/16* (2013.01); *G10L 15/1815* (2013.01); *G10L 15/22* (2013.01)

(58) Field of Classification Search
CPC ..... G10L 15/16; G10L 15/1815; G10L 15/22; G10L 15/28; G06N 5/04; G06N 20/00
See application file for complete search history.

(56) References Cited

U.S. PATENT DOCUMENTS

| | | | |
|---|---|---|---|
| 9,117,178 B1 * | 8/2015 | Chiu | G06Q 10/00 |
| 10,552,541 B1 * | 2/2020 | Dreher | G06N 5/02 |
| 10,783,876 B1 * | 9/2020 | Hoover | G10L 15/1815 |
| 2015/0185996 A1 | 7/2015 | Brown et al. | |
| 2019/0019112 A1 * | 1/2019 | Gelfenbeyn | G06F 9/54 |
| 2019/0065975 A1 | 2/2019 | White | |

(Continued)

OTHER PUBLICATIONS

Stauch; International Search Report and Written Opinion of PCT/US2022/032620; dated Sep. 20, 2022; 14 pgs.

*Primary Examiner* — Eric Yen
(74) *Attorney, Agent, or Firm* — K&L Gates LLP

(57) ABSTRACT

Devices and techniques are generally described for a speech processing routing architecture. First input data representing an input request may be received. First data including a semantic interpretation of the input request may be determined. Metadata of the first input data may be determined. The metadata may identify an entity associated with the input request. In some examples, a query may be sent to a first component. The query may include the metadata. In some examples, second data that identifies a first skill associated with the entity may be received from the first component. In various examples, the first skill may be selected for processing the first input data based at least in part on the first data and the second data.

20 Claims, 7 Drawing Sheets

(56) References Cited

U.S. PATENT DOCUMENTS

| | | | |
|---|---|---|---|
| 2021/0019375 A1* | 1/2021 | Croutwater | G06F 16/3344 |
| 2021/0141862 A1* | 5/2021 | Huang | G06N 3/044 |
| 2021/0217414 A1* | 7/2021 | Hara | H04N 21/472 |
| 2022/0139385 A1* | 5/2022 | Cheng | G06F 16/35 |
| | | | 704/9 |
| 2022/0230000 A1* | 7/2022 | Jalaluddin | G06F 40/295 |
| 2022/0272054 A1* | 8/2022 | Gao | G06F 40/284 |

* cited by examiner

NATURAL LANGUAGE PROCESSING ROUTING

BACKGROUND

Automatic speech recognition (ASR) combined with language processing techniques may enable a computing device to retrieve and process commands from a user based on the user's spoken commands. In some systems, speech recognition and/or voice-controlled devices activate upon detection of a spoken "wakeword." Natural language processing is used to translate the spoken requests into semantic interpretations of the spoken command. A speech processing application (e.g., a "skill") is selected for processing the spoken request. Executable instructions are generated based on the semantic interpretation of the spoken command. The executable instructions are executed by the skill and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
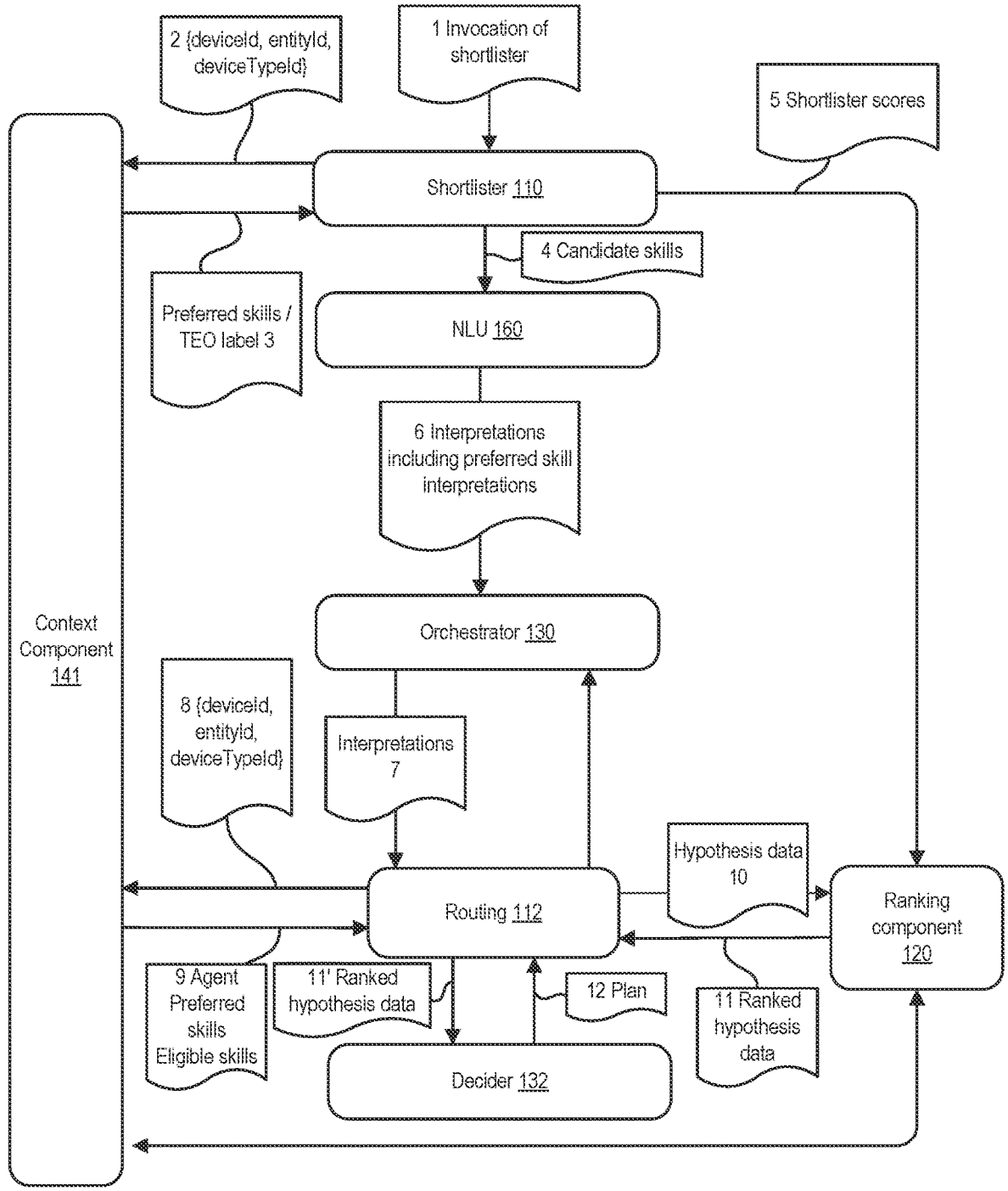
FIG. 1 is a block diagram illustrating an example system that may determine a routing destination for input request data, in accordance with various aspects of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language, resulting in specific executable commands or other type of instructions. ASR and NLU may be used together as part of a speech processing system. Text-to-speech (TTS) is a field of computer science, artificial intelligence, and linguistics concerned with enabling computers to output synthesized speech.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may be used with TTS where a machine learning model may receive input audio data (e.g., request data representing user request data and/or user text input data) and may generate output audio data in response to the utterance.

As used herein, user utterances, input text data, and/or any form of input data requests input to a speech processing system may be described by "request data." Such request data may change forms many times during processing of the request data by various components of the speech processing system, as described in further detail below. For example, initially the request data may be audio data and/or input text data representing a user question. The audio data may be transformed into text or other meaning representation data ("ASR output data") by an ASR component of the speech processing system. For example, the text data may be transformed into intent data by a natural language understanding (NLU) component of the speech processing system. The intent data may be used by a skill (e.g., a speech processing application, natural language processing application, and/or some other component of an application) to perform an action (e.g., to generate action data that may be processed in order to take some corresponding action such as playing video and/or audio). "Request data" and/or "user request data" may refer to any data related to an input request to a speech processing system (e.g., including the various data forms described above, as each of the aforementioned data types relate to an input request to the speech processing system). In general, as used herein, skills may be any software (and/or combination of software and hardware) used during natural language processing to take an action in response to input request data (e.g., natural language inputs such as user utterances and/or text). Skills may process intent data representing the input request data. Skills may be referred to herein as "speech processing applications."

As the number of skills continues to increase, selection of skill for processing an input request is a non-trivial task. Various machine learned statistical models may be used to select a skill for processing an input request. In some examples, an entity (e.g., an enterprise organization such as a particular company) may want to use a speech processing interface for interactions with their products, for advertising their products, to assist their employees during performance of their duties, etc. For example, the entity may deploy one or more custom skills used to interact with a product produced by the entity. However, it may be difficult for the entity to ensure that input requests that pertain to the product are routed to the custom skills, since there may be a large number of potentially-applicable skills that may handle the input requests. This may be especially pertinent when the enterprise-specific skill is not explicitly named as part of the user's request.

In some other examples, the entity may want to deploy a customized speech processing agent for interactions that pertain to the entity or to the entity's products. A speech processing agent may be, for example, a personified entity (e.g., a voice assistant) with which a user can interact. The speech processing agent may have its own behavior, voice, capabilities, etc., that may distinguish the speech processing agent from other speech processing agents.

In various examples described herein, a routing architecture is described that allows entities to provide various contextual data that enables a speech processing system to route incoming input requests to the entity's preferred and/or customized skills, when the input requests are determined to be associated with the entity. Additionally, various techniques described herein allow the entity to provide a customized experience related to their products and/or to speech processing systems associated with the entity. In some examples, the routing architectures described herein may be effective to enforce business mandates provided by entities. Additionally, in some examples described herein, an entity may modify the customized experiences provided for that entity. For example, an interface may be provided to allow the entity to modify its list of preferred skills, to add, modify, or delete speech processing agents associated with the entity, remove skills and/or devices from the customized experience, etc.

In various examples, applications may determine an action to take for processing particular request data according to an interpretation of the natural language input (represented by the request data), as determined by NLU. For example, a particular application may be selected to process request data based on a determination that the request data refers to the particular application by name. In another example, an application may evaluate its ability to process request data based on one or more intents and/or named entities determined during NLU processing of the request data. In another example, a speech processing system may determine an application that may generate a response to request data that may be output via a TTS component of the speech processing system. Selection of the appropriate action and/or the appropriate skill used to take the action and/or process the request data is non-trivial. Described herein is a speech processing routing architecture that may be used to determine whether a particular input request is associated with an entity. If so, contextual data related to the entity may be retrieved using a component effective to store and provide such contextual data. The contextual data may include speech processing agents associated with the entity, eligible skills for input requests associated with the entity, preferred skills for processing input requests associated with the entity, etc. The contextual data may be used by various components of a natural language processing routing architecture, described herein, to make routing decisions for incoming natural language requests and to favor skills designated as being preferred by the entity over non-preferred skills.

Various components of a speech processing system may ingest such contextual data and may route input requests based on such contextual data. For example, a list of preferred skills that is associated with an input request deemed to be associated with an entity may be sent as an input signal to a shortlister component that is effective to generate a list of candidate skills that may be used to process the input request. In another example, a routing component may generate hypothesis data for candidate skills output by the shortlister component and/or otherwise determined by an NLU component. The hypothesis data may comprise intent data (e.g., data representing a semantic interpretation (e.g., a semantic representation) of the input request), a skill identifier comprising an identification of a skill effective to process the intent data, and speech processing agent identifier data. The speech processing agent identifier data may identify a speech processing agent from among other speech processing agents. The routing component may compare the different hypothesis data to a list of eligible skills retrieved from the contextual data component. If one of the skills identified by the hypothesis data is not among the eligible skills, the routing component may disqualify the particular hypothesis data, thereby preventing further processing and/or consideration of the disqualified hypothesis data. In another example, a ranking component may receive the valid (e.g., the non-disqualified) hypothesis data and may rank skills among the hypothesis data for processing the input request using contextual signals associated with the entity (e.g., a list of preferred skills, entity identifier data, strategic intent data (data indicating a higher priority of one or more skills than the list of preferred skills), etc.).

The speech processing routing architecture may facilitate the routing of request data to appropriate skills and/or other speech processing components. In various examples, the speech processing routing architecture may use machine learning models trained using features computed using user feedback data, contextual data, can fulfill intent request (CFIR) tags, and/or other predictive signals in order to determine the appropriate speech processing application and/or other speech processing component to process request data. In various examples, using machine learning models to dynamically learn routing may improve the accuracy of the routing of speech processing requests, resulting in improved user experiences and/or more pertinent responses to request data. For example, a machine learning system may dynamically learn from contextual data and/or user feedback data to provide routing exceptions and/or routing flexibility, in contrast to a deterministic routing system.

Natural language processing may be used in a variety of contexts, including in speech processing enabled devices (e.g., devices employing voice control and/or natural language processing "voice assistants") and/or systems. Examples of natural language processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon-.com, Inc. of Seattle, Washington, etc.

Speech processing enabled devices may include one or more microphones (e.g., far-field microphone arrays) used to transform audio into electrical signals. Natural language processing may then be performed, either locally by the speech processing enabled device, by one or more other computing devices communicating with the speech processing enabled device over a network, or by some combination of the speech processing enabled device and the one or more other computing devices. In various examples, speech processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., contextual data and/or any personal data) may be controlled by a user using privacy controls associated with a speech processing enabled device and/or a companion application associated with a speech processing enabled device. Accordingly, users may opt out of storage of personal and/or contextual data and/or may select particular types of personal and/or contextual data that may be stored while preventing aggregation and storage of other types of personal and/or contextual data. Additionally, aggregation, storage, and use of personal and/or contextual information, as described herein, may be compliant with privacy controls, even if not legally subject to them. For example, personal, contextual, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data that may be used to optimize the machine learning techniques described herein may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

A natural language-controlled computing system may respond to request data (e.g., data representing a user request) by outputting content and/or performing one or more other actions, such as initiating communications (e.g., synchronous phone/video calls and/or asynchronous messaging), playing music, providing information, calling a taxi, displaying an image, controlling other devices, etc. Generally, input data received by the various natural language processing systems and components described herein may comprise natural language input data. Natural language input data may be in the form of audio data representing spoken request data (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Natural language processing systems may be configured with multiple applications (e.g., thousands, tens of thousands, or more skills) that can be used to potentially respond to a user request. Natural language processing systems may be effective to process spoken and/or textual natural language inputs to determine data representing a semantic understanding of the inputs. Applications may include any application effective to receive inputs from a natural language processing system in order to take one or more actions based on those inputs. In various other examples, skills may be a component of such applications and/or other system that interfaces with a natural language processing system. In some other examples, applications may be skills. For example, a speech processing system may include music skills, video speech processing skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of an application by a user's request may include a request that an action be taken. In at least some examples, a "skill," "skill component," "speech processing skill," "application," and the like may be software running on a computing device, similar to a traditional software application running on a computing device. Such skills may include a voice user interface in addition to or instead of, in at least some instances, a graphical user interface, smart home device interface, and/or other type of interface.

In various examples, a speech processing enabled device may include a wakeword detection component. The wakeword detection component may process audio data captured by microphones of the speech processing enabled device and may determine whether a keyword (e.g., a wakeword) is detected in the audio data. When a wakeword is detected, the speech processing enabled device may enter a "sending mode" in which audio detected by the microphones following the wakeword (e.g., data representing request data spoken after the wakeword) may be sent to speech processing computing component(s) for further speech processing (e.g., ASR, NLU, etc.). In various examples, the wakeword detection component may be used to distinguish between audio that is intended for the speech processing system and audio that is not intended for the speech processing system.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result may determine the activation of a neuron in a subsequent layer. In addition, a bias value may be used to shift the output of the activation function to the left or right on the x-axis and thus may bias a neuron toward inactivation.

Generally, in machine learning models, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent algorithm (or gradient ascent algorithm) to incrementally adjust the weights to cause the most rapid decrease (or increase) to the output of the loss function. The method of updating the parameters of the machine learning model may be referred to as back propagation.

FIG. 1 is a block diagram illustrating an example system that may determine a routing destination for input request data, in accordance with various aspects of the present disclosure. In various examples, a user may send a request to a natural language processing system (not shown). The request may be processed (e.g., by a device with which the user is interacting, such as a smart phone, tablet, and/or other computing device to generate data representing the request. In various examples, the data representing the request (e.g., request data) may include various metadata. For example, the request data may include a device ID (e.g., device identifier data identifying the device on which the user made the request), an entity ID (e.g., identifier data identifying an entity associated with the user account and/or the device), a device type ID, (e.g., identifier data identifying a type of device on which the user made the request), a time of day of the request, geolocation data associated with the request, etc. The device type ID may identify the particular type of device and may be used to determine characteristics of the device, such as whether or not the device includes a screen. As described in further detail below, in some examples the metadata may be used to query a context component 141 to receive various types of contextual data that may be used to make various routing decisions for processing the natural language input.

An NLU component 160 may use various statistical machine learned models (and/or heuristic and/or graph-based approaches) that may be used to generate intent data that represents one or more semantic interpretations of the input request data. In various examples, prior to generating intent data, the shortlister component 110 may be invoked at action 1 to determine a subset of candidate skills for processing the current natural language input. In various examples, the orchestrator 130 and/or the NLU component 160 may invoke the shortlister upon receiving natural language input for processing.

As described in further detail below, the shortlister component 110 may include machine learned models effective to determine a subset of candidate skills that may be effective to process the input request data from among a larger set of skills. Prior to providing ASR output data (or a representation thereof) as an input to one or more machine learned models of the shortlister component 110, the shortlister component 110 may call a context component 141 with a query comprising the device ID, entity ID, and/or deviceType ID (and/or other metadata) received as part of the input request data at action 2. In various examples, the entity with which the request data is associated (e.g., a tailored experience owner (TEO)) may provision various contextual data with the context component 141. For example, the entity may provision a list of preferred skills that are preferred for processing natural language input requests that are associated with the entity. The entity may also store relational data associating device IDs, user IDs, entity IDs with the entity. In some further examples, the context component 141 may store identifier data identifying speech processing agents that are associated with the entity. In various further examples, the context component 141 may store a list of eligible skills that are eligible for processing input requests that are associated with the entity. In some further examples, the context component 141 may store exclusive skills that are exclusive to the entity and/or a speech processing agent and which are prioritized over other skills.

As described in further detail below, other contextual data associated with the entity and stored by the context component 141 may include eligible skill capability data that represents responses of various eligible skills for the entity. The eligible skill capability data may be compared to CFIR tag responses to filter out skills where the CFIR tag responses do not correspond to the relevant eligible skill capability. Another example of contextual data stored by context component 141 and associated with the entity may include exclusive skill capability data. Exclusive skill capability data may be a subset of the eligible skill capability data that identify skill capabilities that are exclusive to a particular speech processing agent. Another example of contextual data stored by context component 141 and associated with the entity may include an entity label (e.g., a TEO label that differentiates different use cases (e.g., for different entities) that are using the same skill). Another example of contextual data stored by context component 141 and associated with the entity may include strategic intents identifier data. Strategic intents identifier data may list skill/intent data combinations. If NLU output data comprises an intent identified among the strategic intents identifier data for the entity, the preferred skills for the entity may be ignored (e.g., not given any elevated priority) for request-routing purposes in favor of the skill/intent data of the strategic intents. The various contextual data described herein and stored in association with an entity and/or speech processing agent may be pre-fetched from a memory (e.g., a memory of context component 141) upon receipt of a request and stored in a cache to minimize latency. For example, upon receipt of an input request that comprises identifier data identifying an entity and/or a speech processing agent, various contextual data described herein may be fetched (e.g., from context component 141) and stored in a cache. Thereafter, when the various components described herein request such contextual data, the contextual data may be retrieved from the cache.

In the example depicted in FIG. 1, in response to the query at action 2 including the {deviceId, entityId, deviceTypeId}, the context component 141 may send the list of preferred skills associated with the entity and the TEO label for the entity to the shortlister component 110 (action 3). In the current example, the request data may be a request sent to a speech processing enabled device of a vehicle. The request may be a request to turn on the air conditioner. The preferred skills may be returned from the context component 141 as {CarControlSkill, CarMainenanceSchedulerSkill}. The shortlister component 110 may receive the NLU output data, the list of preferred skills, and the TEO label as input and may generate a ranked list of candidate skills for processing the input request data (e.g., candidate skills at action 4). In the current example, the ranked list of candidate skills may include the preferred skills {CarControlSkill, CarMainenanceSchedulerSkill}. The shortlister component 110 may learn during training to weight preferred skills more heavily when generating the list of candidate skills. Shortlister component 110 may generate respective scores (e.g., shortlister scores output at action 5) for the candidate skills representing a confidence that the respective skills are appropriate to process the current request data. The scores may be used to rank the candidate skills. As described below, the scores may be used during ranking of the various hypothesis data for processing the input request by ranking component 120.

The candidate skills and/or the shortlister scores output by the shortlister component 110 may be sent to the NLU component 160. The NLU component 160 may determine intent data for one or more of the candidate skills output by the shortlister component 110. Additionally, the NLU component 160 may determine that the input request data is likely to correspond to other intents apart from those associated with the candidate skills output by the shortlister component 110. In the current example, the NLU component 160 may determine the intent {CarControlIntent} for the candidate skill {CarControlSkill} output by the shortlister component 110. Additionally, the NLU component 160 may determine that the input request data has a strong correlation with the intent {DeviceControlIntent} even though the {DeviceControlIntnet} may not be among the candidate skills determined by the shortlister component 110.

At action 6, NLU component may send the intent data (e.g., the interpretations of the request data including interpretations for the preferred skills and for NLU-determined skills that may or may not be among the preferred skills) to an orchestrator 130. As described in further detail below, the orchestrator 130 may initiate a session and may communicate with various downstream natural language processing components during the natural language processing session to determine and execute an action for the current request data. In some examples, the orchestrator 130 may persist state data that may be used by various natural language processing components described herein.

At action 7, the orchestrator 130 may send the interpretations of the request data (e.g., the intent data) determined by NLU component 160 to routing component 112. The routing component 112 may query the context component 141 using a query including the deviceId, entityId, and/or deviceTypeId for the input request data. In response, at action 9, the context component 141 may return a list of preferred skills, a list of eligible skills, and a speech processing agent associated with the input request data (e.g., determined using the deviceId, entityId, and/or deviceTypeId).

The routing component 112 may generate hypothesis data for the interpretations received at action 7. For example, for the {DeviceControlIntent} the routing component 112 (and/or a skill proposal component described in further detail below) may determine that the intent may be processed using {SmartHomeSkill}. Additionally, the routing component 112 and/or the skill proposal component may determine that the {CarControlSkill} may be used to process the {CarControlIntent}. The speech processing agent returned at action 9 may be "Car" (e.g., a personified virtual assistant entity used to control various systems within a particular brand of car). However, the Alexa speech processing agent may also be available for processing input request data. The eligible skills returned at action 9 may include {CarControlSkill} (among other eligible skills) and the preferred skill, in the current example, may be {CarControlSkill}.

The routing component 112 may generate the following hypothesis data: [{CarControlIntent, CarControlSkill, Car}, {DeviceControlIntent, SmartHomeSkill, Alexa}]. The hypotheses {CarControlIntent, CarControlSkill, Alexa}, {DeviceControlIntent, SmartHomeSkill, Car} are not generated as Alexa may be ineligible for CarControlSkill and Car may be ineligible for SmartHomeSkill. A skill query service (described in further detail below) may query the respective skills in the hypothesis data. In response, the skills send CFIR tags indicating an action that the skill would take if selected for processing the input request data (and/or an ability of the skill to process the input request data). The CFIR tags returned to the skill query service may be compared to the eligible skill capability data received from the context component 141. If there is a mismatch, the relevant hypothesis may be discarded. In the current example, the CFIR tags may match the eligible skill capability data, thus the hypothesis data [{CarControlIntent, CarControlSkill, Car}, {DeviceControlIntent, SmartHomeSkill, Alexa}] may be sent to ranking component 120 (action 10).

As described in further detail below, ranking component 120 may rank the various hypotheses of the hypothesis data. Inputs to the one or more machine learned models of the ranking component 120 may include the scores for the candidate skills output by the shortlister, data identifying a speech processing agent associated with the entity/device (received from context component 141), the list of preferred skills received from the context component 141 (e.g., for the entity), strategic intent data received from the context component 141, and/or the TEO label received from the context component 141. In the current example, the ranking component 120 may rank the {CarControlIntent, CarControlSkill, Car} hypothesis higher than the {DeviceControlIntent, SmartHomeSkill, Alexa} based at least in part on the CarControlSkill being among the list of preferred skills. The ranked hypothesis data may be sent from the ranking component 120 to the routing component 112 (action 11). The routing component 112 may send the ranked hypothesis data to the decider component 132 (action 11'). As described in further detail below, the decider component 132 may determine a routing plan for the input request data (action 12). The plan may include instructions effective to cause the intent data, slot data, etc., to be sent to a particular skill for processing the input request data.

Figure 2:
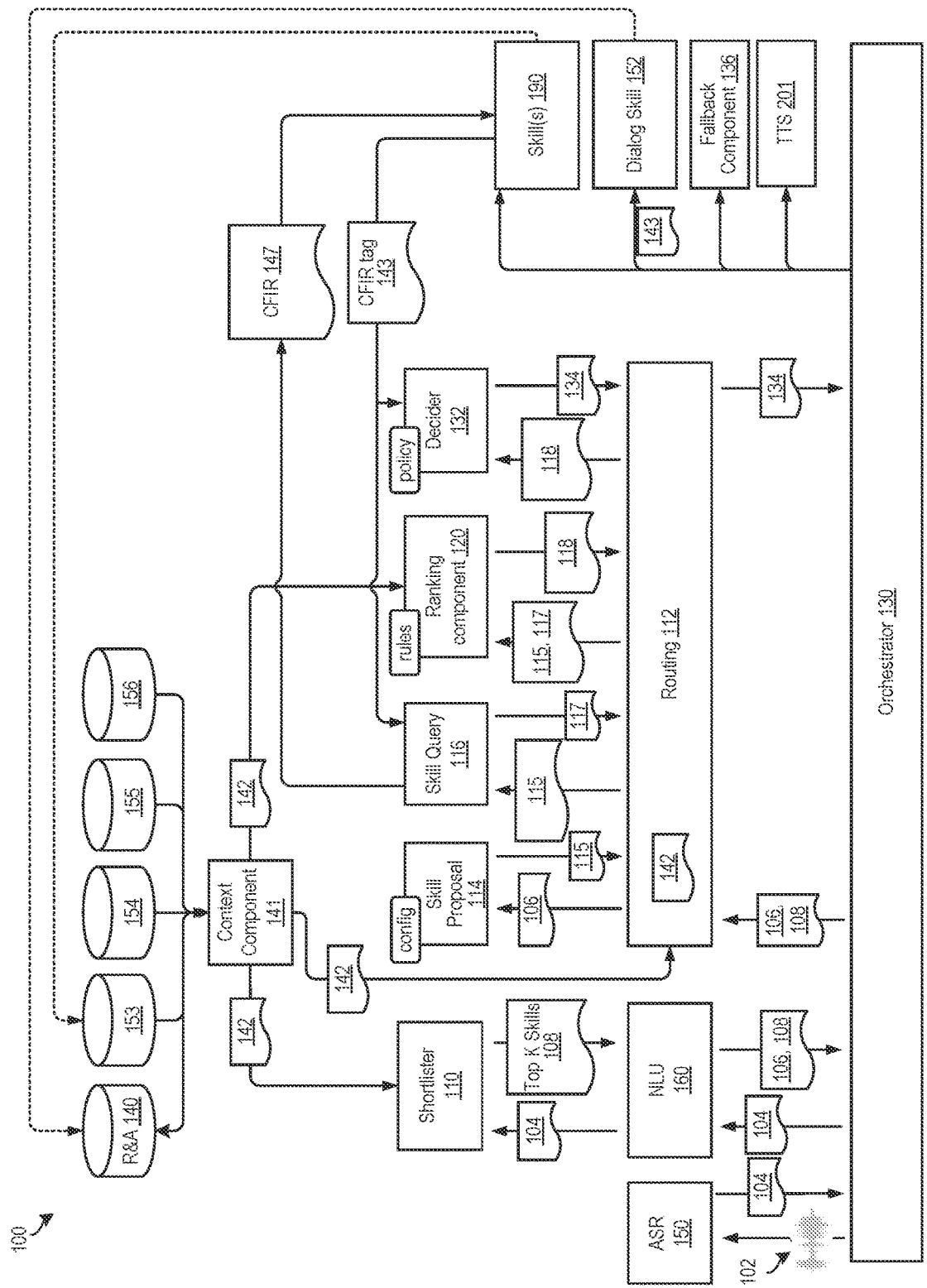
FIG. 2 is a block diagram illustrating an example speech processing routing architecture, according to various embodiments of the present disclosure.

FIG. 2 is a block diagram illustrating an example natural language processing system 100, according to various embodiments of the present disclosure. In various examples below, skills may be referred to, however the techniques described herein with respect to skills are applicable to any natural language processing applications. A system according to the present disclosure may operate using various components as described in FIG. 2. The various components illustrated FIG. 2 may be located on the same or different physical devices. Communication between various components illustrated in FIG. 2 may occur directly or across a network. A speech processing-enabled device may capture audio using an audio capture component, such as one or more microphone(s). The speech processing enabled device may send audio data 102 (e.g., corresponding to request data) to an orchestrator 130 of the natural language processing system 100. The speech processing enabled device may also send metadata (e.g., including device identifiers, device type data, contextual data, IP address data, room location data, etc.) to the orchestrator 130. The components depicted in FIG. 2, including components of a speech processing system may be generally referred to as spoken language processing components, a natural language processing system 100 a spoken language processing system, speech processing components, and/or a speech processing routing system. Additionally, in various examples, the components depicted in FIG. 2 may process written input (e.g., text data) in addition to spoken input.

Upon receipt by the natural language processing system 100, the audio data 102 may be sent to an orchestrator 130. The orchestrator 130 may include memory and logic that enables the orchestrator 130 to initiate a dialog session and to transmit various pieces and forms of data to various components of the system, as described in further detail below.

The orchestrator 130 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data and/or other ASR output data 104 generated thereby to orchestrator 130 that may, in turn, send the text data (and/or other ASR output data 104) to NLU component 160. As previously described, the text data and/or other ASR output data 104 may include one or more ASR hypotheses. The text data and/or other ASR output data 104 may include a top scoring hypothesis of the speech represented in the audio data 102 or may include an N-best list including a group of hypotheses of the speech represented in the audio data 102, and potentially respective scores ASR processing confidence scores. As previously described, in some other examples, the ASR component 150 (and/or other components of the natural language processing system 100) may generate other metadata associated with the request such as an overall utterance confidence score, per-word (e.g., per token) confidence scores for the utterance, utterance duration, stream duration (e.g., duration of the stream of audio data from speech processing enabled device to natural language processing system 100), a number of tokens output by ASR, etc.

The NLU component 160 attempts to make a semantic interpretation of the phrases or statements represented in the text data (and/or other ASR output data) input therein. That is, the NLU component 160 determines one or more meanings associated with the phrases or statements represented in the text data and/or other ASR output data 104 based on individual words represented in the text data (and/or other ASR output data 104). The NLU component 160 interprets a text string to derive an intent of the user (e.g., an action that the user desires be performed) as well as pertinent pieces of information in the text data (and/or other ASR output data) that allow a device (e.g., the speech processing enabled device, the natural language processing system 100, a computing device(s) implementing a speech processing application, etc.) to complete the intent. For example, if the text data and/or other ASR output data 104 corresponds to "Set temperature to 74 degrees," the NLU component 160 may determine the user intended to invoke a climate intent with a target temperature value slot of 74 degrees Fahrenheit. As previously described, in addition to the NLU intent and slot data, the NLU component 160 may generate other metadata associated with the request (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speech processing application, intent, and/or slot), entity recognition confidence scores, entity recognition match types (e.g., exact match, prefix match, suffix match, etc.), etc. Herein, the data output by the NLU component 160 (depicted in FIG. 2 as "NLU 160") is referred to as NLU output data 106.

NLU component 160 may send the text data (and/or other ASR output data 104) and/or some of NLU output data 106 (such as intents, recognized entity names, slot values, etc.) to a shortlister component 110. The shortlister component 110 may comprise one or more machine learning models that may be effective to predict a subset of speech processing applications that are most likely to be able to correctly process the request data, based on the input of the text data (and/or other ASR output data 104) and/or the NLU output data 106. In addition, the shortlister component 110 may call the ranking and arbitration component 140 to request features pre-computed by the ranking and arbitration component 140 according to features used as inputs by the machine learning models of shortlister component 110. As previously described, the shortlister component 110 may define source data used to compute the features and/or may specify functions used to generate the features from the source data (e.g., formulae and/or functions) prior to runtime processing of request data. The ranking and arbitration component 140 may precompute the features according to the specified feature definitions supplied by shortlister component 110 and by the other components of natural language processing system 100 and may store the precomputed features in memory.

Additionally, as previously described, shortlister component 110 may send a query comprising one or more of the device ID, entity ID, and/or deviceType ID received as part of the input request data. In response, the context component 141 may send contextual data 142 to shortlister component 110. In various examples described herein, the contextual data 142 may include a list of preferred skills associated with the entity (and/or with a speech processing agent that is associated with the entity) and/or a TEO label identifying an owner and/or use case of the speech processing agent (e.g., the entity associated with the input request). In various examples, the shortlister component 110 may ingest this contextual data 142 as input (e.g., input features) and may generate the list of candidate skills for processing the current input request data based at least in part on the contextual data 142. In various examples, the machine learned model(s) of the shortlister component 110 may learn to rank candidate skills that are among the preferred list of skills identified by the contextual data 142 more highly relative to non-preferred skills. As previously described, the shortlister component 110 may generate confidence scores for each of the candidate skills indicating a confidence that the candidate skill is appropriate to process the current input request data. The confidence scores may be sent to the ranking component 120 and used as input to machine learned models of the ranking component 120 in order to rank hypotheses (e.g., {intent, skill, agent} hypotheses) for processing the input request data.

Ranking and arbitration component 140 may generate indexes that may be used to retrieve the precomputed features during runtime (e.g., through an API). Accordingly, during runtime processing, shortlister component 110 may retrieve the precomputed features from ranking and arbitration component 140 used by shortlister component 110 to generate the subset of speech processing applications that are most likely to be appropriate to process the current request data. Accordingly, shortlister component 110 may send the top K skills 108 to NLU component 160. NLU component 160 may thereafter perform skill-specific NLU processing for the skills in the top K skills 108 to determine skill-specific intents, slots, and/or named entities. NLU output data 106 may include such skill-specific data (e.g., skill-specific N-best hypotheses). In addition, NLU component 160 may determine interpretations of the input request data (e.g., the ASR output data 104 that are for other skills apart from the top K skills 108 output by the shortlister component 110. In some examples, generating pre-computed features based on user feedback data by ranking and arbitration component 140 may generate increasingly contextually rich feature data that may be used to train various machine learning models used to route speech processing request data (e.g., ranking component 120, shortlister component 110, etc.).

Ranking and arbitration component 140 may communicate with various systems in order to obtain source data used to precompute features. In an example embodiment, ranking and arbitration component 140 may receive source data used to precompute features that is generated by other speech processing components (e.g., NLU component 160, ASR component 150, etc.). For example, NLU intent data may be used to pre-compute features for some downstream speech processing component (e.g., ranking component 120). Ranking component 120 may be "downstream" in the sense that processing by NLU component 160 occurs prior to processing by ranking component 120 during a given dialog session. In another example, ranking and arbitration component 140 may communicate with feedback storage 153 to receive user feedback data (e.g., explicit and/or implicit user feedback related to user satisfaction with processing of one or more request data) used as source data to precompute features. In various examples, the user feedback data may be user-specific and/or device specific and may indicate whether a user was satisfied or not satisfied with a particular interaction with natural language processing system 100. Additionally, ranking and arbitration component 140 may communicate with endpoint context system 154, which may provide context data at the conclusion of a user interaction with the natural language processing system 100. In another example, ranking and arbitration component 140 may communicate with speech processing application data 156 to determine information from the speech processing application regarding past interactions with the speech processing application and/or data acquired by the speech processing application. Additionally, ranking and arbitration component 140 may communicate with other data sources 155, as new services are added and/or as new data types that may be useful for routing prediction are made available. In addition to ranking and arbitration component 140 using contextual data 142 to precompute features used by various machine learning models of the routing architecture of the natural language processing system 100, a context component 141 may receive the contextual data 142. The context component 141 may provide the context data directly to both ranking and arbitration component 140 as well as to various components of the routing architecture of natural language processing system 100. For example, the context component 141 may send contextual data 142 to shortlister component 110 and/or ranking component 120 in order to determine a shortlist of skills 190 for particular request data and/or in order to rank the shortlisted speech processing applications.

NLU output data 106 (e.g., intent data comprising semantic interpretations of the input request data) and top K skills 108 may be sent by NLU component 160 to orchestrator 130. Orchestrator 130 may send the top K skills 108 and the NLU output data 106 to routing component 112. Routing component 112 may query context component 141 using one or more of the device ID, entity ID, and/or deviceType ID received as part of the input request data. In response, the context component 141 may send contextual data 142 to routing component 112.

In various examples, the contextual data 142 provided to routing component 112 may include a list of eligible skills, a list of exclusive skills (e.g., a subset of the list of eligible skills that are exclusive for the context of the current input request (e.g., for the particular entity and/or speech processing agent)), eligible skill capability data, exclusive skill capability data, and/or TEO labels. Eligible skill capability data represents responses of various eligible skills for the entity. As described below, the eligible skill capability data may be compared to CFIR tag responses to filter out skills where the CFIR tag responses do not correspond to the relevant eligible skill capability. Another example of contextual data stored by context component 141 and associated with the entity may include exclusive skill capability data. Exclusive skill capability data may be a subset of the eligible skill capability data that identify skill capabilities that are exclusive to a particular speech processing agent.

Routing component 112 may send the top K skills 108 and NLU output data 106 to skill proposal component 114. Skills 190 may subscribe to particular intents using skill proposal component 114. Accordingly, skill proposal component 114 may receive the NLU output data 106 and may determine whether any of the included intents correspond to one or more of skills 190 that have registered for the particular intent. If so, skill proposal component 114 may generate candidate hypothesis data comprising <Intent, Skill, Agent> candidate triples 115. In various examples, the candidate triples 115 may further include slot data identifying entities included in the request data that have been recognized using named entity recognition and/or entity resolution. The candidate triples 115 may be sent to routing component 112.

Routing component 112 may compare the candidate triples 115 to the list of eligible skills specified by contextual data 142. Ineligible skills (e.g., for the applicable speech processing agent) may be filtered out. For example, for an automobile manufacturer entity's speech processing agent used to interact with voice controlled system in the automobile manufacturer entity's vehicles, candidate triples 115 may include a candidate triple 115 <ClimateControlIntent, CarControlSkill, Car> that may be an eligible skill for the automobile manufacturer entity's speech processing agent (e.g., "Car"). Accordingly, routing component 112 may generate hypothesis data {ClimateControlIntent, CarControlSkill, Car}. However, the CarControlSkill and/or ClimateControlIntent may not be an eligible skill for the Alexa speech processing agent. Accordingly, the potential hypothesis data {ClimateControlIntent, CarControlSkill, Alexa} may be filtered out and may not be used for further processing. If the hypothesis data includes an exclusive skill, all candidate triples 115 that do not include exclusive skills may be filtered out.

The hypothesis data comprising the candidate triples 115 may be sent by routing component 112 to skill query service 116. Skill query service 116 comprises an API through which skills 190 may "opt out" of particular requests. For example, a skill 190 may comprise a video playback skill. Accordingly, the skill 190 may register with skill query service 116 to indicate that only requests made on a device with a display screen should be routed to the particular skill 190. In addition, skills 190 may communicate availability information, pricing information, and/or other structured descriptions of how and under what circumstances (e.g., determined using context data) the skill 190 can fulfill a request included in the current request data.

Skill query service 116 provides a capability for speech processing applications (e.g., skills) to provide signals to ranking component 120 that indicate how well the particular speech processing application may handle the current request data. For example, skill query service 116 may send a "Can fulfill intent request" (CFIR) 147 to candidate skills (e.g., top K skills 108 output by shortlister component 110). CFIR 147 may include intent data and/or slot data from the NLU output data 106. Each of the candidate skills may respond to the CFIR 147 with CFIR response data indicating whether the skills are able to process the current request data. Additionally, one or more of the candidate skills may respond to the CFIR 147 with CFIR tag 143, which may be metadata indicating an action and/or type of action that the particular candidate skill will perform if the request data is routed to the particular candidate skill for processing.

As previously described, the various candidate skills may evaluate an ability to fulfill a current request based on a determination as to whether the skill is effective to process the intent data and/or recognize the slot data that is provided with the CFIR 147. Additionally, the skill may include a CFIR tag 143 with the response data that indicates a particular action that the skill would take if the skill is ultimately selected for processing the current request. For example, the CFIR tag 143 may be metadata indicating that the skill is able to process the intent successfully. In another example, the CFIR tag 143 may indicate that the skill intends to engage the user in a dialog in response to being selected to process the current request. In another example, the CFIR tag 143 may indicate that the skill intends to initiate streaming of video and/or audio (e.g., initiate video playback and/or audio playback) in response to being selected to process the current request. In another example, the CFIR tag 143 may indicate that the skill intends to render a spoken response (e.g., audio data output by a TTS component) to the user in response to being selected to process the current request.

In various examples, skill query service 116 may generate a signal 117 representing the CFIR tag 143 and/or the candidate skills' responses to the CFIR 147. The signal 117 may be sent to routing component 112. Routing component 112 may compare the CFIR tag 143 to the actions indicated by the eligible skill capability data and/or to the exclusive skill capability data (where applicable). If the CFIR tag 143 does not match the action/capability represented by the eligible skill capability data of contextual data 142, the hypothesis including the relevant candidate triple 115 may be filtered out (e.g., excluded from further routing decisions). Conversely, if the CFIR tag 143 represented by signal 117 indicates an action that matches the eligible skill capability data (or exclusive skill capability data, where applicable) the relevant hypothesis candidate triple 115 may be sent to ranking component 120.

The ranking component 120 may query context component 141 for contextual data 142 using one or more of the device ID, entity ID, and/or deviceType ID received as part of the input request data. The contextual data 142 sent to the ranking component 120 may include a list of preferred skills associated with the entity and/or speech processing agent, the TEO label, and/or a list of strategic intents. The TEO label may be an identifier used to indicate the entity and/or current use case of the speech processing agent. This label may be used to differentiate between different use cases from different entities that are using the same skill. The list of strategic intents may be data comprising a list of skill and intent combinations that has higher priority than the skills of the list of preferred skills. If the hypothesis candidate triples 115 sent to the ranking component 120 include intents in the strategic intent list, the ranking component 120 may disregard the list of preferred skills for prioritizing routing of the input request data for processing in favor of the skill/intent in the strategic intents. In some examples, strategic intents may be used to instantiate and/or train the machine learned models of a newly-deployed skill.

The ranking component 120 may use such contextual data 142 during ranking of the hypothesis data represented by the candidate triples 115. For example, the ranking component 120 may rank hypothesis data including a preferred skill higher than hypothesis data that does not include a preferred skill. Skill query service 116 may send a signal 117 indicating what skills can fulfill a particular request (and/or what skills are unable to fulfill the request), and/or how well the skill is able to fulfill the request. The signal 117 may be sent to routing component 112. Routing component 112 may send the signal 117 along with the candidate triples 115 to a ranking component 120. In various examples, CFIR tag 143 may indicate situations in which a skill may opt out of processing a particular request (e.g., if the device sending the request data does not include a display screen, etc.). Accordingly, in at least some examples, CFIR 147 may include context data, such as a device ID, to indicate the context of the speech processing enabled device from which the request data was received.

Ranking component 120 may include one or more statistical machine learning models effective to rank the candidates included in candidate triples 115. In order to rank the candidate triples 115, ranking component 120 may generate confidence scores for each corresponding candidate triples 115. As previously described, the ranking component 120 may receive the confidence scores generated by shortlister component 110 and may use such scores as an input signal to rank the hypothesis data comprising the candidate triples 115. A confidence score output by ranking component 120 may indicate that the corresponding skill 190 and/or intent of the candidate pair is appropriate to process the request. Ranking component 120 may compute features using the candidate triples 115, the contextual data 142, and signal 117 (representing CFIR tag 143 and/or skill responses to CFIR 147) in order to predict the ranking of the skills 190 included in the candidate triples 115. The features computing during processing of the request data (sometimes referred to as "runtime features") may comprise a feature representation of the list of candidate triples 115 and/or a representation of the signal 117. Additionally, ranking component 120 may query ranking and arbitration component 140 for precomputed features that have been defined for use by ranking component 120. As previously described, the precomputed features may be determined based on contextual data, user feedback data, past usage data, skill data, previous rankings of ranking component 120, etc. The list of preferred skills and/or strategic intents may cause the ranking component 120 to rank candidate triples 115 associated with preferred skills (e.g., skills associated with an entity) and/or strategic intents more highly relative to candidate triples that are not associated with elevated priority for the current context.

Ranking component 120 may generate a ranked list 118 of the candidate skills indicated in candidate triples 115. In at least some examples, the ranking component 120 may use a deep neural network as a machine learning model for determining the ranked list 118. Inputs to the machine learning models of the ranking component 120 may include NLU output data 106, signal 117 (comprising CFIR tag 143), contextual data 142, data representing enabled skills (e.g., for the speech processing enabled device and/or account that received the input request data/utterance), NLU confidence data, ASR confidence data, etc.

In addition, ranking component 120 (and/or some other natural language processing system 100 component, such as decider component 132) may determine one or more rules that may override the ranked list 118 such that a lower ranked skill and/or a skill that is not one of the candidate triples 115 is selected for processing the request data. For example, a dynamic routing adjustment may be inserted in order to emphasize a newly-implemented skill 190. The dynamic routing adjustment may divert some speech processing requests (e.g., a percentage of relevant request data) to the newly-implemented skill 190 in spite of the newly implemented skill 190 not being the top result (or potentially even among the results) of ranked list 118. Similarly, the newly-implemented skill 190 may be inserted among the top K skills 108 determined by the shortlister component 110. Once a sufficient amount of user feedback for the newly-implemented skill 190 has been obtained, the dynamic routing adjustment may be removed. The machine learning models of the ranking component 120 and shortlister component 110 may be retrained based on the newly-implemented skill and based on the user feedback the newly-implemented skill 190 has received as a consequence of the dynamic routing adjustment. Accordingly, thereafter the shortlister component 110 may include the newly-implemented skill 190 in the top K skills 108 as appropriate for a given incoming request. Similarly, ranking component 120 may rank the newly implemented skill 190 as appropriate for processing the request.

In various examples, a decider component 132 may receive the ranked list 118 of candidates (including any candidates selected via a dynamic routing adjustment, as described above). In some examples, the decider component 132 may act as a check on the results of the ranking component. For example, there may be scenarios in which statistical models of the ranking component 120 may determine that a request should be routed to a particular skill to perform a particular action. However, there may be risks associated with performance of the action or with routing the request data to the skill for processing. For example, a user may say the phrase "turn on the oven." The ranking component may determine that the top-ranked result is a control skill that is effective to process the request data to turn on the oven. However, contextual data 142 may indicate that the user is not currently at home. Accordingly, turning on the oven may currently be unsafe, and the statistical result of the ranking component 120 may not be a safe or an intended result according to a particular policy. The policy may be a set of deterministic rules used to provide safety boundaries on sensitive requests.

Accordingly, the decider component 132 may compare the results of the ranking component 120 to one or more predefined policies that may indicate whether or not request data should be sent to top-ranked result of the ranking component 120 or whether some other action should be taken. For example, if the phrase "Arm the security system" is interpreted by ASR/NLU as the current utterance, the decider component may comprise a policy indicating that the ranking component results should be ignored and that the utterance should always be passed to a security system skill used to control security system hardware.

In another example, a decider component may determine a class of the utterance. For example, if the utterance is classified as belonging to a sensitive class the speech processing system may use a dialogue speech processing application and/or TTS to confirm the user's intention prior to routing the request data to the top-ranked result of the ranker component. For example, request data may be a request to "unlock the front door." The top-ranked result of the ranking component may be routing to a skill that controls the lock on the front door. However, requests to unlock doors may be classified by the decider component 132 as a sensitive request. Accordingly, the receipt of the sensitive request may trigger a confirmation request output by TTS prior to routing the request data to the top-ranked skill. For example, the confirmation request may be "Did you want me to unlock the front door?"

Decider component 132 may output plan data that comprises a routing plan 134 for processing the request data. The routing plan 134 may define a target skill 190 to process the request data. As described above, the target skill 190 may be selected as the top-ranked hypothesis determined by the ranking component 120. In some other examples, the decider component 132 may select a target skill 190 based on a policy and/or based on a class of the request data, as described above. In some examples, the ranking component 120 may determine that two different skills are equally applicable for processing the request data. In such examples, the decider component 132 may determine that disambiguation should occur. Accordingly, the routing plan 134 may include sending the request data to a dialog skill 152 that may output (via TTS) one or more questions (e.g., a disambiguation request) used to prompt the user to disambiguate between the two equally likely (or approximately equally likely) interpretations of the request data. For example, it may be unclear, based on a user's request, whether the user intended to invoke a movie playback skill or a music playback skill, as a movie and a soundtrack for the movie may be identified using the same name. Accordingly, the decider component 132 may determine that the top two hypotheses of ranking component 120 are equally likely (or approximately equally likely) and may determine that a question should be asked to disambiguate between the two possible actions. Accordingly, the routing plan 134 may route the request data to the dialog skill 152, and the dialog skill 152 may inquire whether the user intended to play the movie or the soundtrack.

In another example, the decider component 132 may determine that the user was not satisfied with the top hypothesis of the ranking component 120 (e.g., due to explicit or implicit feedback received from the user in response to taking an action associated with the top ranking component 120 hypothesis). Accordingly, the decider component 132 may determine that the routing plan 134 should be to determine the second highest ranked hypothesis of the ranking component 120. The routing plan 134 may be sent to the fallback component 136. In various examples, the fallback component 136 may determine a list of the top hypotheses, top intents, and/or top ASR text interpretations from the previous turn of dialog, and may select a fallback option for processing the request data from the lists.

The natural language processing system 100 may also include a TTS component 201 that synthesizes speech (e.g., generates audio data) corresponding to text data input therein. Accordingly, one or more of skills 190, dialog skill 152, fallback component 136, ASR component 150, and/or orchestrator 130. The TTS component 201 may perform speech synthesis using one or more different methods. In one method of synthesis called unit selection, the TTS component 201 matches text data against one or more databases of recorded speech. Matching units are selected and concatenated together to form audio data. In another method of synthesis called parametric synthesis, the TTS component 201 varies parameters such as frequency, volume, and noise to create an artificial speech waveform output. Parametric synthesis uses a computerized voice generator, sometimes called a vocoder.

Figure 3:
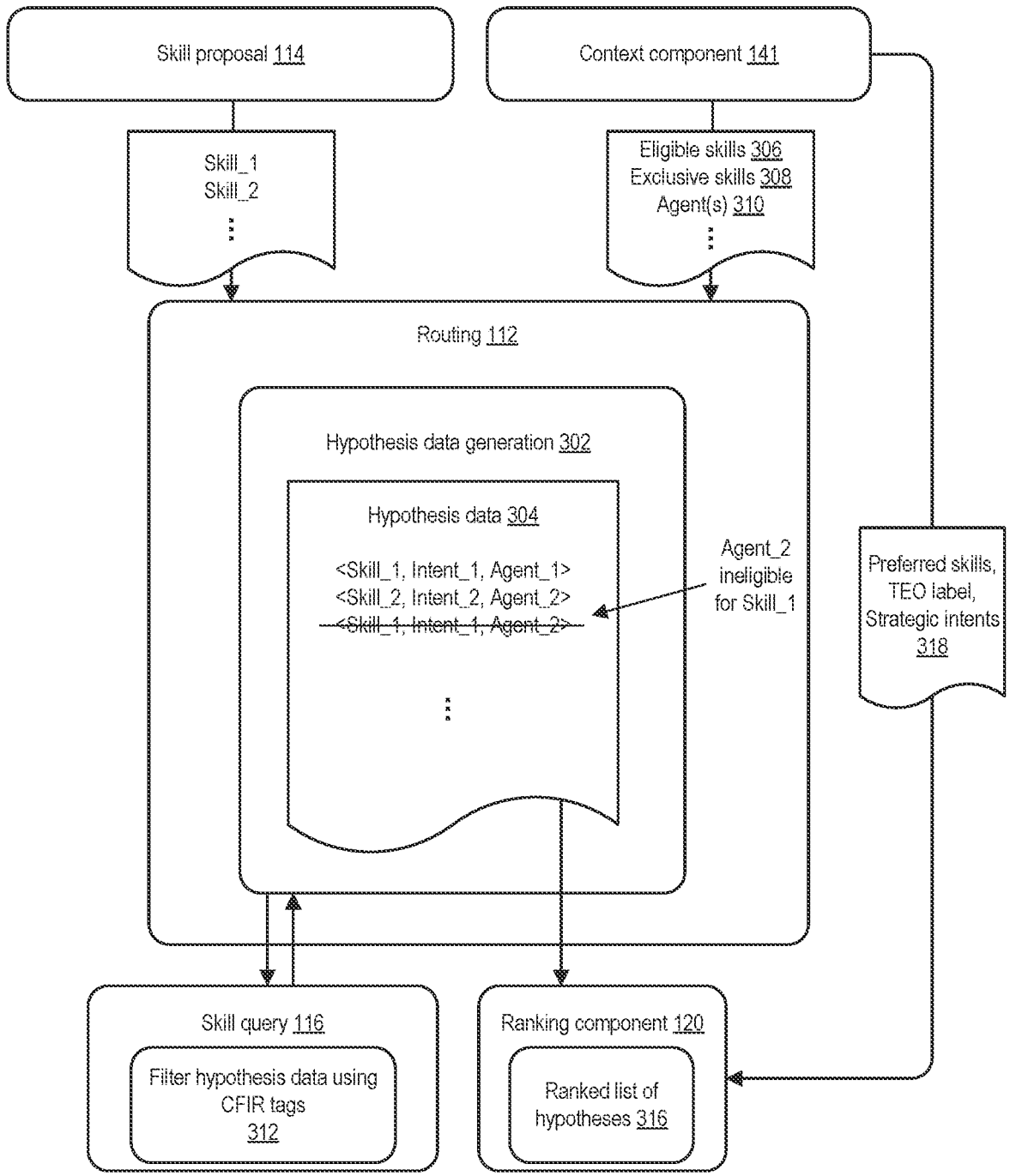
FIG. 3 is a block diagram illustrating an example of determining a routing destination for an input request using contextual data related to a requesting entity, in accordance with various embodiments described herein.

FIG. 3 is a block diagram illustrating an example of determining a routing destination for an input request using contextual data related to a requesting entity, in accordance with various embodiments described herein. As previously described, NLU component 160 provides one or more interpretations of the input request data as intent data. The interpretations may be for the candidate skills output by the shortlister component 110 and/or other intents determined by the NLU component 160 to be close matches to the input request data.

The intents determined by NLU component 160 may be sent to skill proposal component 114. Skill proposal component 114 may return a number of different skills that have registered for the intents and/or have otherwise been determined to be applicable to process the intents. Data identifying the skills may be sent from the skill proposal component 114 to the routing component 112. Additionally, the routing component 112 may query context component 141 for contextual data (e.g., contextual data 142) that may comprise one or more of a list of eligible skills 306, a list of exclusive skills 308, and/or speech processing agents 310. Routing component 112 may perform hypothesis data generation 302 comprising candidate triples of the form {intent, skill, agent}. However, if a skill is ineligible for a particular agent, the candidate triple may be excluded for that agent. Accordingly, in the example depicted in FIG. 3, the candidate triple <Skill_1, Intent_1, Agent_2> may be invalid as skill_1 (and/or intent_1) may not be among the list of eligible skills 306 for Agent_2.

The hypothesis data 304 may be sent to skill query service 116. Skill query service 116 may query the skills identified in the hypothesis data 304 using CFIR (as described above). The CFIR responses may be sent to routing component 112. Routing component 112 may compare the CFIR responses (e.g., CFIR tags 143) to the eligible skill capabilities to determine if the skill takes the expected action. If not, the candidate triple may be excluded (e.g., filtered out) from the hypothesis data 304. In various other embodiments, the skill query service 116 may filter hypothesis data using the CFIR tags (action 312). The same process may be applied to exclusive skills to the extent the hypothesis data 304 includes one or more exclusive skills for the current input request data.

The filtered hypothesis data 304 may be sent to ranking component 120. Ranking component 120 may separately query context component 141 and may receive the list of preferred skills, TEO label, and/or a list of strategic intents as contextual data 318, as described above. The ranking component may receive the filtered hypothesis data 304, and the contextual data 318 as inputs into a deep neural network (and/or other machine learned model) employed by the ranking component 120 to rank the hypothesis data 304. Ranking component 120 may output a ranked list of the various hypothesis 316. As previously described, due to the contextual data ingested during the routing procedure described herein, preferred skills for an entity may be more heavily weighted when making a routing decision for an utterance associated with the entity. Accordingly, traffic that pertains to the entity may be more often routed to the entity's preferred skills. For example, a hotel may use a particular speech processing agent and/or set of speech processing skills to allow customers to use voice interactions to perform various actions such as order room service, set an alarm, request additional towels, etc. Requests from devices associated with the hotel may be routed to the set of preferred skills (and to the speech processing agent) preferred by the hotel. However, if a user request is unrelated to the preferred skills and/or to the hotel's speech processing agent, the request may be routed to and/or processed by another, more appropriate skill using the various routing techniques described herein.

Figure 4:
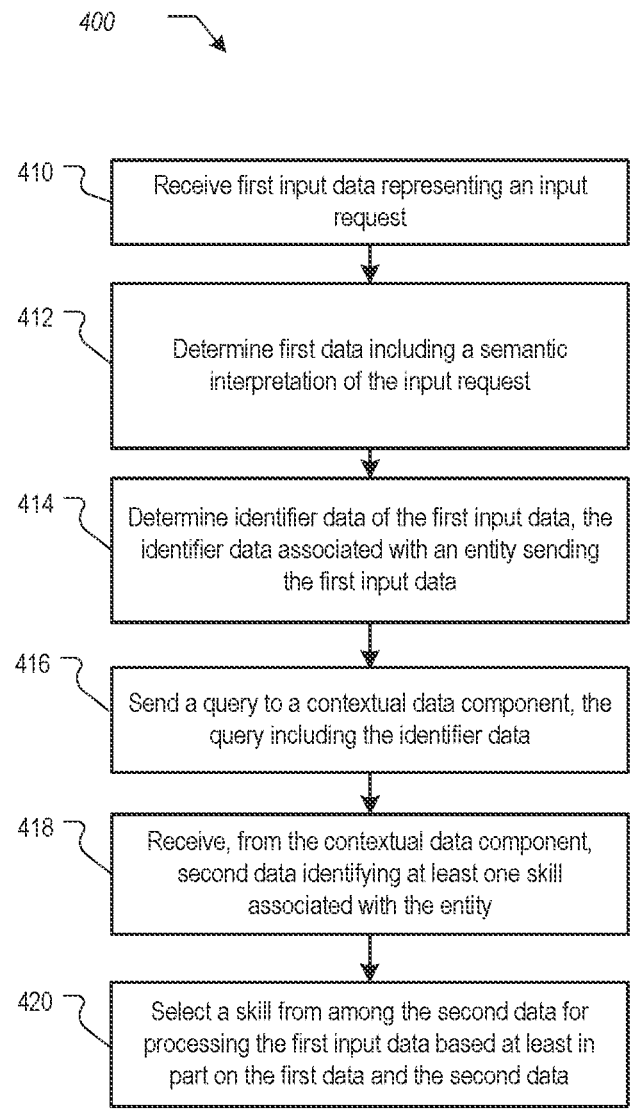
FIG. 4 depicts a flow chart showing an example process for determining a routing destination for an input request using contextual data related to a requesting entity, in accordance with various aspects of the present disclosure.

FIG. 4 depicts a flow chart showing an example process 400 for determining a routing destination for an input request using contextual data related to a requesting entity, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which first input data may be received that represents an input request. In various examples, the first input data may represent user input text and/or speech comprising a command or request to be executed by natural language processing system 100 and/or a skill configured in communication with natural language processing system 100.

Process 400 may continue at action 412, at which first data that includes a semantic interpretation of the input request may be determined. In various examples, NLU component 160 may be used to determine intent data comprising a semantic interpretation of the input request data. In various examples, ASR component 150 may be used to transform input audio data representing the request into text data. The text data, or other ASR output data, may be input into the NLU component to determine intent data representing a semantic interpretation of the input.

Process 400 may continue at action 414, at which identifier data of the first input data may be determined. The identifier data may be associated with an entity sending the first input data. For example, the identifier data may be a device identifier identifying a device at which the input request was received (e.g., a user device that is speech processing enabled). In some other examples, the identifier data may be an entity ID that directly identifies an entity from among other entities. For example, a company may include such entity IDs with all speech processing requests sent over their network. In some other examples, the identifier data may include a device type identifier indicating a type of the device at which the input request is received. For example, the device type identifier may identify a model number of the device and/or may indicate various capabilities of the device (e.g., whether the device includes a display screen, speakers, etc.). The identifier data may take other forms apart from those specifically mentioned here. In general, the identifier data may be used to identify an entity and/or speech processing agent associated with the input request so that the relevant contextual data may be retrieved for routing and/or processing the input request, as described herein.

Process 400 may continue at action 416, at which a query may be sent to a contextual data component, the query including the identifier data. At action 416, a query that includes the identifier data associated with the first input data (e.g., the input request) may be sent to a contextual data component (e.g., context component 141) to retrieve contextual data (e.g., contextual data 142) related to the entity and/or speech processing agent that is associated with the identifier data. The specific context data requested using the query may depend on the particular component of the natural language processing system 100 that is requesting the context data. For example, the shortlister component 110 may request a first set of context data, while each of the routing component 112 and the ranking component 120 may request different sets of contextual data, as described herein.

Process 400 may continue at action 418, at which second data may be received from the contextual data component (e.g., context component 141). The second data may identify at least one skill associated with the entity. For example, the second data may comprise a list of preferred skills and/or strategic intents that are to be prioritized when selecting a skill for processing the input request.

Process 400 may continue at action 420, at which a skill from among the second data may be selected for processing the first input data based at least in part on the first data and the second data. At action 420, a skill may be selected based at least in part on the contextual data (e.g., contextual data 142) received from the entity that identifies one or more skills, speech processing agents, etc., to be prioritized over other skills that are not associated with the entity. Additionally, the skill may be selected based at least in part on the first data that represents a semantic interpretation of the input request. Accordingly, although the preferred skills associated with the entity may be preferred over other skills in many cases, if the semantic interpretation of the input request relates to an action which the preferred skills are not capable of performing, another, more appropriate skill may instead be selected for processing the input request.

Figure 5A:
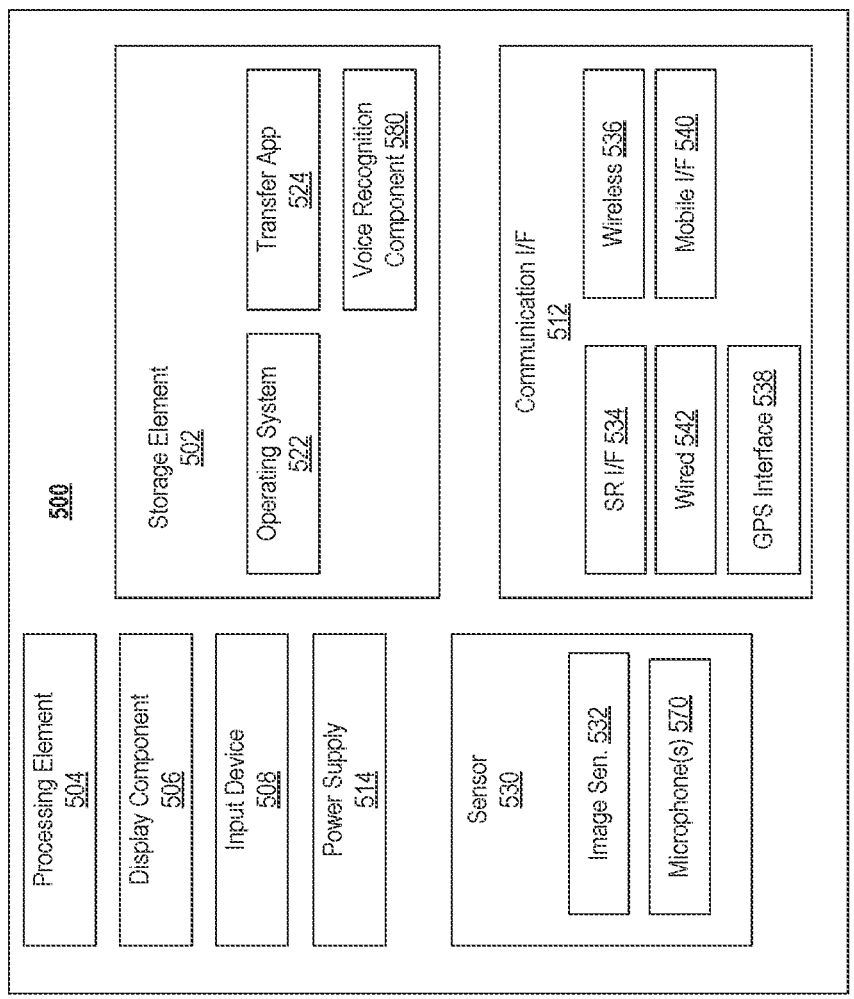
FIGS. 5A-5B are block diagrams showing example architectures of computing devices that may be used in accordance with various embodiments described herein.

FIG. 5A is a block diagram showing an example architecture 500 of a computing device that may be used to implement, at least in part, natural language processing system 100, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). In some examples, the processing element 504 may be effective to determine a wakeword and/or to stream audio data to natural language processing system 100. The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500. In some examples, the transfer application 524 may also be configured to send the received voice requests to one or more voice recognition servers (e.g., natural language processing system 100).

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display content determined provided by a skill executed by the processing element 504 and/or by another computing device.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. Voice recognition component 580 may interpret audio signals of sound captured by microphone 570. In some examples, voice recognition component 580 may listen for a "wakeword" to be received by microphone 570. Upon receipt of the wakeword, voice recognition component 580 may stream audio to a voice recognition server for analysis, such as natural language processing system 100. In various examples, voice recognition component 580 may stream audio to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as a computer communication network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5A. An example of an image sensor 532 may be a camera configured to capture color information, image geometry information, and/or ambient light information.

Figure 5B:
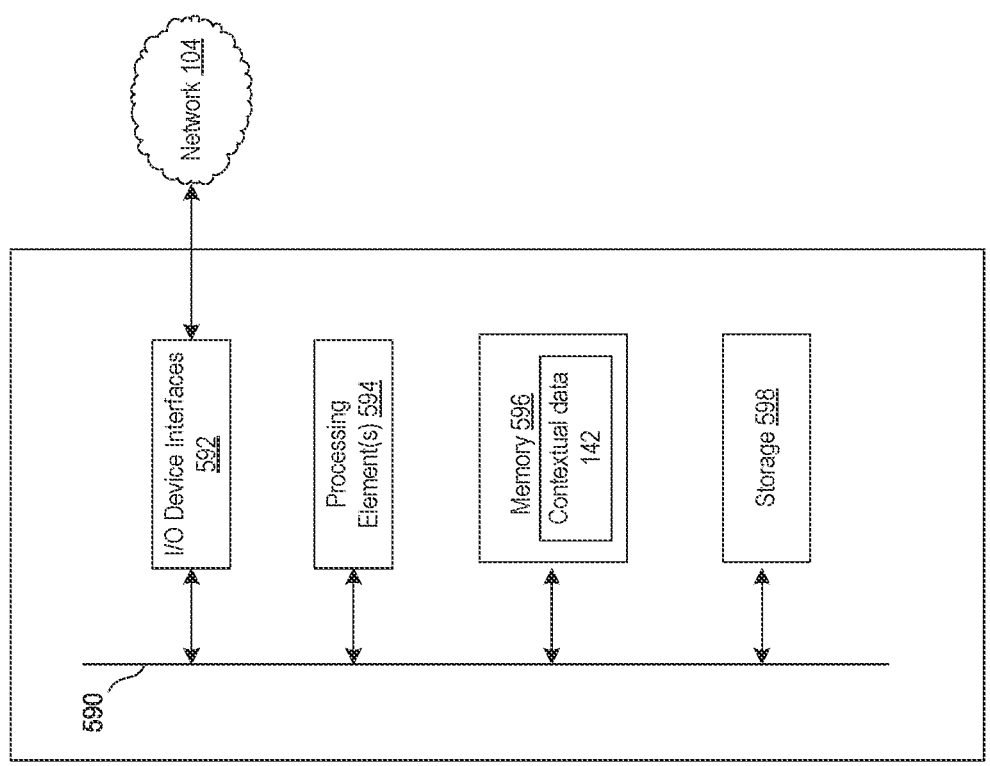

FIG. 5B is a block diagram conceptually illustrating example components of a remote device, such as a computing device executing a particular skill 190, a computing device executing one or more components of natural language processing system 100 (e.g., the ranking and arbitration component 140, ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills 190, etc. In operation, each of these devices (or groups of devices) may include non-transitory computer-readable and computer-executable instructions that reside on the respective device, as will be discussed further below.

Each computing device of natural language processing system 100 may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the ranking component 120, skills 190, shortlister component 110, etc., when loaded from data storage component 598. In various further examples, memory 596 may be effective to store instructions effective to program controllers/processors 594 to perform the various techniques described above in reference to retrieval of contextual data 142 related to an entity and/or a speech processing agent, as described above in reference to FIGS. 1-4. Accordingly, in FIG. 5B, contextual data 142 is depicted as being stored within memory 596, as an example.

The memories 596 may individually include volatile random access memory (RAM), non-volatile read only memory (ROM), non-volatile magnetoresistive memory (MRAM), and/or other types of memory. Each computing device of natural language processing system 100 may also include data storage component 598 for storing data and controller/processor-executable instructions. Each data storage component 598 may individually include one or more non-volatile storage types such as magnetic storage, optical storage, solid-state storage, etc. Each computing device of natural language processing system 100 may also be connected to removable or external non-volatile memory and/or storage (such as a removable memory card, memory key drive, networked storage, etc.) through respective input/output device interfaces 592. In various examples, the contextual data 142 may be stored in memory 596 and/or data storage component 598.

Computer instructions for operating each computing device of natural language processing system 100 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), data storage component 598, or an external device(s). Alternatively, some or all of the executable instructions may be embedded in hardware or firmware on the respective device in addition to or instead of software.

Each computing device of natural language processing system 100 includes input/output device interfaces 592. A variety of components may be connected through the input/output device interfaces 592, as will be discussed further below. Additionally, each computing device of natural language processing system 100 may include an address/data bus 590 for conveying data among components of the respective device. Each component within a computing device of natural language processing system 100 may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of the natural language processing system 100, as described herein, are exemplary, and may be located as a stand-alone device or may be included, in whole or in part, as a component of a larger device or system.

Figure 6:
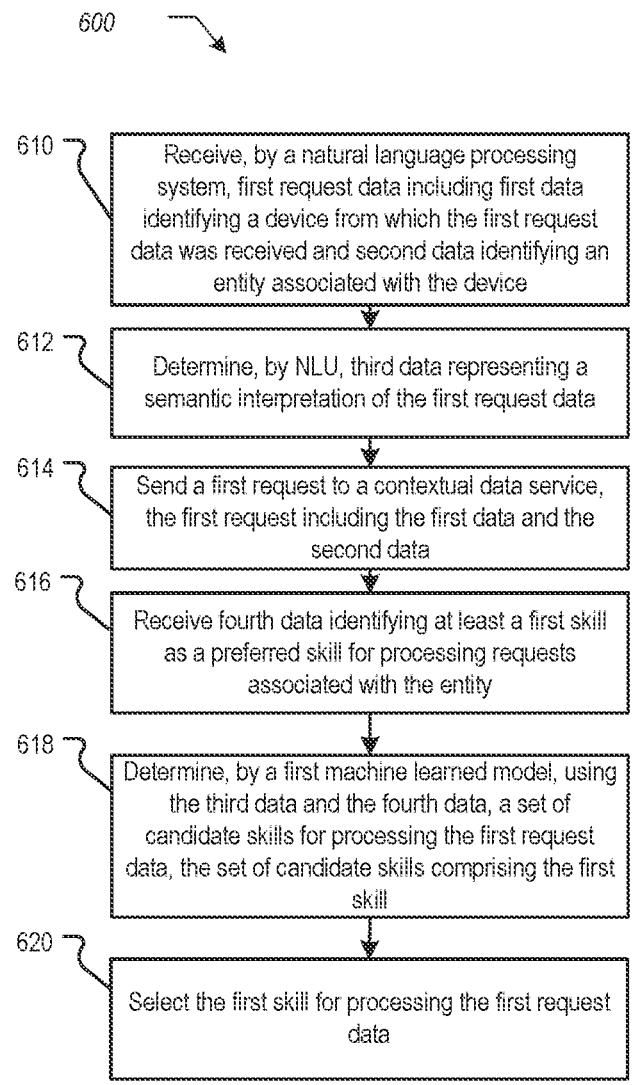
FIG. 6 depicts a flow chart showing another example process for determining a routing destination for an input request using contextual data related to a requesting entity, in accordance with various aspects of the present disclosure.

FIG. 6 depicts a flow chart showing another example process 600 for determining a routing destination for an input request using contextual data related to a requesting entity, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine code may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

In some examples, process 600 may begin at action 610, at which a natural language processing system (e.g., natural language processing system 100) may receive first request data including first data identifying a device from which the first request data was received and second data identifying an entity associated with the device. The various identifier data included in the first request may be used to determine an entity associated with the request and thereby determine one or more preferred skills and/or speech processing agents to be prioritized for processing the first request data.

Processing may continue at action 612, at which NLU component 160 may determine third data representing a semantic interpretation of the first request data. In various examples, NLU component 160 may be used to determine intent data comprising a semantic interpretation of the first request data. In various examples, ASR component 150 may be used to transform input audio data representing the request into text data. The text data, or other ASR output data, may be input into the NLU component to determine intent data representing a semantic interpretation of the input first request data.

Processing may continue at action 614, at which a first request may be sent to a contextual data service (e.g., context component 141). In various examples, the first request may include the first data and the second data included in the first request data received at action 610. The first request may represent a query for various contextual data (e.g., contextual data 142). The specific contextual data requested in the query may depend on the component of the natural language processing system 100 that is making the request for the contextual data. As described above in reference to FIGS. 1-3, different contextual data 142 may be requested by different components of the natural language processing system 100. Additionally, the various contextual data 142 may be used differently by the different components as described above in reference to FIGS. 1-3.

Processing may continue to action 616, at which fourth data that identifies at least a first skill as a preferred skill for processing requests associated with the entity may be received from the contextual data service (e.g., context component 141). For example, fourth data comprising the list of preferred skills associated with the relevant entity (e.g., the entity associated with the first request data, as identified by the first data and/or the second data received at action 610) may be requested and received by the shortlister component 110 and/or the ranking component 120. A representation of the list of preferred skills may be input into one or more machine learned models of the shortlister component 110 and/or the ranking component 120 and may be used to determine the output of these components. Generally, skills from the shortlister component 110 and/or the ranking component 120 may be prioritized over non-preferred skills.

Processing may continue to action 618, at which a first machine learned model may determine a set of candidate skills for processing the first request data using the third data and the fourth data. The set of candidate skills may include the first skill. For example, shortlister component 110 may determine a set of candidate skills for processing the first request data using the fourth data that identifies the first skill as a preferred skill for the relevant entity. Additionally, the first machine learned model of the shortlister component 110 may use the intent data (e.g., the semantic interpretation) of the first request data to generate the set of candidate skills for processing the first request data. The set of candidate skills may include the first skill identified as being a preferred skill for the entity associated with the first request data.

Processing may continue to action 620, at which the first skill may be selected for processing the first request data. For example, the natural language processing system 100 described above in FIG. 2 may be used to determine a skill to which to route the first request data for performing some action in response to the first request data. In the current example, the skill selected for processing the first request data may be the first skill which is a preferred skill for the entity associated with the first request data.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, by a natural language processing system, first request data representing a user request, the first request data comprising first data identifying a device from which the first request data was received and second data identifying an entity associated with the device from among other entities;
   determining, by a natural language understanding component, third data comprising a semantic representation of the user request;
   sending a first request to a contextual data service, the first request comprising the first data and the second data;
   receiving, from the contextual data service, fourth data identifying a first skill as a preferred skill for processing utterances associated with the entity;

determining, by a first machine learned model, using the third data and the fourth data, a set of candidate skills for processing the first request data, wherein the set of candidate skills comprises the first skill;

selecting the first skill for processing the first request data; and sending the first request data to the first skill for processing.

2. The method of claim 1, further comprising:

determining, by a first routing component, a first candidate pair comprising fifth data identifying the first skill and first intent data corresponding to the first skill;

sending a second request to the contextual data service, the second request comprising the first candidate pair; and receiving, from the contextual data service, sixth data identifying a speech processing agent associated with the first candidate pair and seventh data identifying eligible skills for the speech processing agent.

3. The method of claim 2, further comprising:

sending the sixth data and the first candidate pair to a second machine learned model; and generating, by a second machine learned model, a ranked list of the set of candidate skills, wherein the first skill is selected for processing the first request data based at least in part on the first skill being among the ranked list of the set of candidate skills.

4. A method comprising:

receiving first input data representing an input request;

determining first data comprising a semantic interpretation of the input request;

determining second data associated with the first input data, the second data corresponding to an entity associated with the input request;

sending a query to a first component, the query comprising the second data;

receiving, from the first component, third data identifying a first skill associated with the entity; and selecting, by at least one machine learned model, the first skill for processing the first input data based at least in part on the first data and the third data.

5. The method of claim 4, further comprising:

determining, by a second component, a second skill associated with the first data; and selecting the first skill over the second skill to process the first input data based at least in part on a priority of the first skill.

6. The method of claim 4, further comprising:

receiving, from the first component, a list of eligible skills associated with the entity;

determining, by a second component a second skill associated with the first data;

determining that the second skill is absent from skills in the list of eligible skills; and sending third data to a ranking component, the third data associating the first skill with the first data comprising the semantic interpretation of the input request.

7. The method of claim 4, further comprising:

determining device identifier data identifying a device from which the first input data was received; and determining a first speech processing agent associated with at least one of the device identifier data or the second data corresponding to the entity, wherein the first speech processing agent is a personified entity used as an interface for a speech processing system.

8. The method of claim 7, further comprising:

determining fourth data comprising a first intent, data identifying the first skill, and data identifying the first speech processing agent;

determining, by a second component, a second skill associated with the first data;

determining a second speech processing agent associated with the second skill;

determining fifth data comprising a second intent, data identifying the second skill, and data identifying the second speech processing agent; and sending the fourth data and the fifth data to a ranking component configured to rank skills for processing input requests.

9. The method of claim 4, further comprising:

determining a first speech processing agent associated with the first skill;

determining a second skill associated with the first data;

determining a second speech processing agent associated with the second skill;

determining that the first speech processing agent is associated with the entity; and selecting the first skill for processing the first input data based at least in part on the first speech processing agent being associated with the entity.

10. The method of claim 4, further comprising:

receiving, from the entity, fourth data identifying a second skill as a preferred skill for the entity;

storing the fourth data by the first component;

receiving second input data representing a second input request;

determining that the second input data is associated with the entity;

sending a second query to the first component, the second query being a request for a list of preferred skills associated with the entity;

receiving the third data identifying the first skill and the fourth data identifying the second skill from the first component; and selecting the second skill for processing the first input data based at least in part on the third data and the fourth data.

11. The method of claim 4, further comprising:

receiving second input data representing a different input request;

determining that the second input data is associated with a different entity;

determining that the first skill is effective to process the second input data;

determining a second skill that is effective to process the second input data; and selecting, by a machine learned model, the second skill for processing the second input data.

12. The method of claim 4, further comprising:

sending the query to the first component prior to determining the first data comprising the semantic interpretation of the input request;

storing the third data in a cache; and sending the first data and the third data as inputs to a machine learned model effective to generate a list of candidate skills for processing the first input data.

13. A system comprising:
at least one processor; and
non-transitory computer-readable memory storing instructions that, when executed by the at least one processor, are effective to:
receive first input data representing an input request;
determine first data comprising a semantic interpretation of the input request;
determine second data associated with the first input data, the second data corresponding to an entity associated with the input request;
send a query to a first component, the query comprising the second data;
receive, from the first component, third data identifying a first skill associated with the entity; and
select, by at least one machine learned model, the first skill for processing the first input data based at least in part on the first data and the third data.

14. The system of claim 13, the non-transitory computer-readable memory storing further instructions that, when executed by the at least one processor, are further effective to:
determine, by a second component, a second skill associated with the first data; and
select the first skill over the second skill to process the first input data based at least in part on a priority of the first skill.

15. The system of claim 13, the non-transitory computer-readable memory storing further instructions that, when executed by the at least one processor, are further effective to:
receive, from the first component, a list of eligible skills associated with the entity;
determine, by a second component, a second skill associated with the first data;
determine that the second skill is absent from skills in the list of eligible skills; and
send third data to a ranking component, the third data associating the first skill with the first data comprising the semantic interpretation of the input request.

16. The system of claim 13, the non-transitory computer-readable memory storing further instructions that, when executed by the at least one processor, are further effective to:
determine device identifier data identifying a device from which the first input data was received; and
determine a first speech processing agent associated with at least one of the device identifier data or the second data corresponding to the entity, wherein the first speech processing agent is a personified entity used as an interface for a speech processing system.

17. The system of claim 16, the non-transitory computer-readable memory storing further instructions that, when executed by the at least one processor, are further effective to:
determine fourth data comprising a first intent, data identifying the first skill, and data identifying the first speech processing agent;
determine, by a second component, a second skill associated with the first data;
determine a second speech processing agent associated with the second skill;
determine fifth data comprising a second intent, data identifying the second skill, and data identifying the second speech processing agent; and
send the fourth data and the fifth data to a ranking component configured to rank skills for processing input requests.

18. The system of claim 13, the non-transitory computer-readable memory storing further instructions that, when executed by the at least one processor, are further effective to:
determine a first speech processing agent associated with the first skill;
determine a second skill associated with the first data;
determine a second speech processing agent associated with the second skill;
determine that the first speech processing agent is associated with the entity; and
select the first skill for processing the first input data based at least in part on the first speech processing agent being associated with the entity.

19. The system of claim 13, the non-transitory computer-readable memory storing further instructions that, when executed by the at least one processor, are further effective to:
receive, from the entity, fourth data identifying a second skill as a preferred skill for the entity;
store the fourth data by the first component;
receive second input data representing a second input request;
determine that the second input data is associated with the entity;
send a second query to the first component, the second query being a request for a list of preferred skills associated with the entity;
receive the third data identifying the first skill and the fourth data identifying the second skill from the first component; and
select the second skill for processing the first input data based at least in part on the third data and the fourth data.

20. The system of claim 13, the non-transitory computer-readable memory storing further instructions that, when executed by the at least one processor, are further effective to:
receive second input data representing a different input request;
determine that the second input data is associated with a different entity;
determine that the first skill is effective to process the second input data;
determine a second skill that is effective to process the second input data; and
select, by a machine learned model, the second skill for processing the second input data.

* * * * *